Aug. 10, 1948.    V. L. ERLICH    2,446,913
PROCESS OF UTILIZING PROTEINACEOUS WASTE LIQUIDS
Filed Nov. 10, 1944
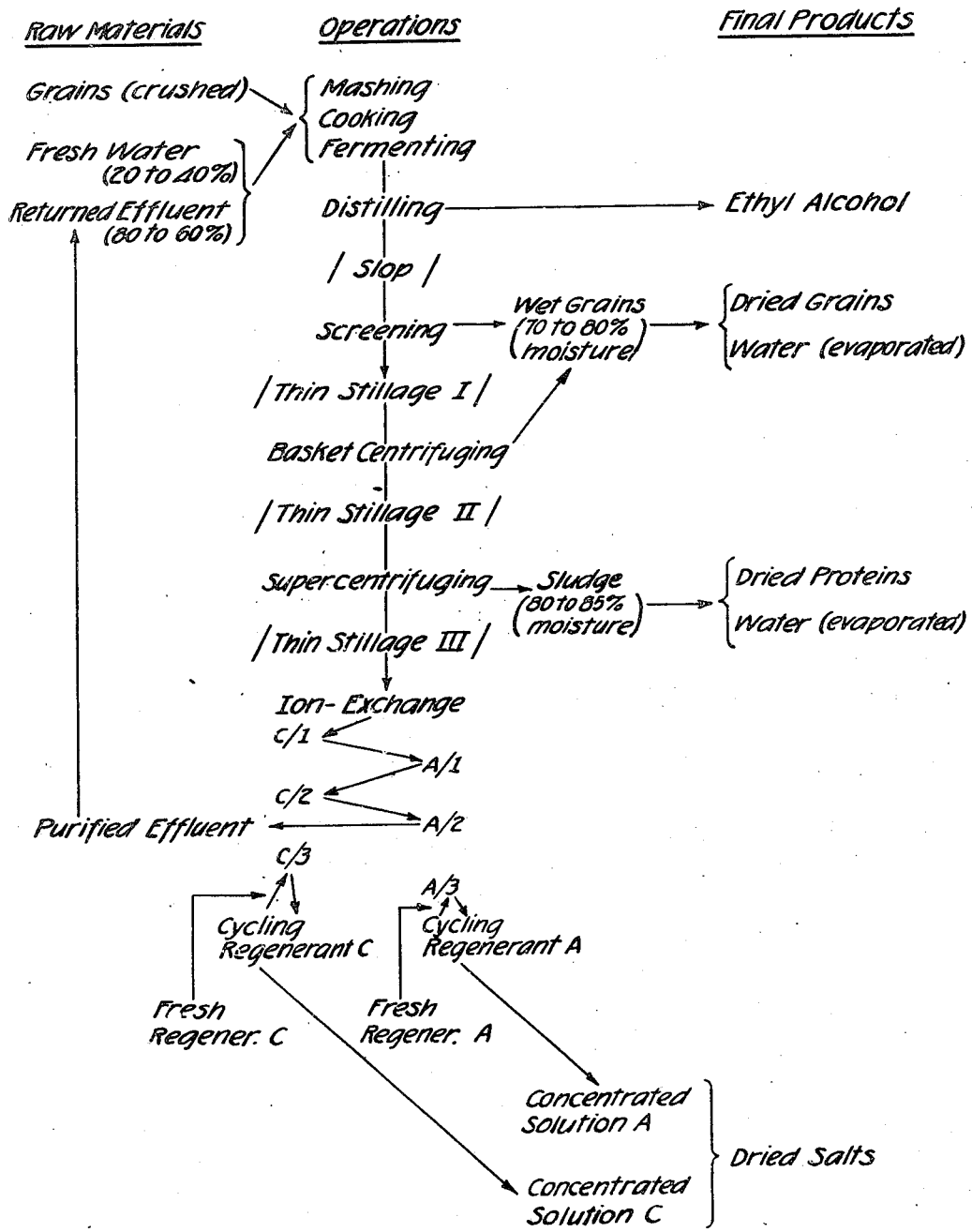
INVENTOR.
Victor L. Erlich
BY
Moses, Nolte, Crew & Berry
ATTORNEYS Patented Aug. 10, 1948

2,446,913

UNITED STATES PATENT OFFICE 2,446,913

PROCESS OF UTILIZING PROTEINACEOUS WASTE LIQUIDS

Victor L. Erlich, New York, N. Y.

Application November 10, 1944, Serial No. 562,906

7 Claims. (Cl. 99—5)

This invention relates to the recovery of valuable products from waste liquids, especially those occurring after the processing of agricultural raw materials. Examples of such waste liquids are those resulting from various fermentation processes, such as from the production of ethyl alcohol, butyl alcohol, yeast, etc.; from the processing of various grains for the production of malt, starch, soya, etc.; from various treatments in the milk, meat and sugar industries, etc.

These waste liquids contain various soluble materials, such as proteinaceous compounds, mineral salts, carbohydrates, vitamins, etc., depending upon the raw materials used and their preliminary treatments. These liquids are low in solid content concentration, and the total volumes of such liquids are so large as to result in appreciable losses of important quantities of valuable materials, which are useful for various purposes, such as foodstuffs, fertilizers, chemical compounds, etc., if the waste liquids are not treated for the recovery of the said solids. In the case of the recovery of such solids by evaporation, it is in many cases necessary to evaporate a hundred or more tons of water per ton of solid material.

The purification of dilute water solutions, by the more or less complete elimination of the mineral salts by ion exchange is well known.

The ion exchangers must be regenerated after they have reached their specific saturation points, so that they may be reused.

It is an object of the present invention to provide an economical process for the recovery of the absorbed compounds.

Another object of the invention is to provide a process whereby the yield of the desired original products of the reaction, such as the alcohol produced by fermentation, is increased.

Still another object is a more simple method of carrying out the desired process.

Some of the novel features of my invention are as follows:

(1) The more complete absorption of compounds of low ionization characterized by a pH value slightly below 7 when acid or of slightly above 7 when alkaline. This is of special importance in the recovery of amino acids and water soluble vitamins.

(2) The direct formation of concentrated regenerant solutions.

(3) The use of adequate regenerating chemicals from the viewpoints of better absorption, economic regeneration and of the composition of the final products in accordance with their intended use.

Regarding the direct formation of concentrated regenerant solutions, it must be emphasized that satisfactory regeneration is linked with definite pH values of the regenerants, which must be sufficiently strong in ionization in order to reverse completely the previous absorption reaction. However, these pH values are not allowed to exceed certain definite limits, as to the concentration of free acid or free alkali so as not to affect the ion exchanger material itself from both the chemical and physical standpoint. For this reason, it is normally recommended that a concentration of 5% or 7% of mineral acid, such as hydrochloric or sulfuric be not exceeded for the cation regeneration, and 3 to 4% of alkali for the anion.

The efficiency of the regenerant drops before complete neutralization is reached, especially when the resulting salts act as pH buffering agents. For example, when using sodium carbonate, the formation of sodium bicarbonate establishes a pH value of about 8.5 and thus interrupts further regeneration, although only one half or less of the potential neutralizing capacity has been used. This fact not only shows that the outflowing regenerant solution contains a great excess of neutralizing chemicals, but, in many cases, it also hinders a complete regeneration, since the compounds of low ionization are removed only under the action of high or low pH values of the regenerants.

In addition to this resulting excess of neutralizing acid or alkali, the solid content of the regenerated salts must necessarily remain low and cannot exceed the equivalent of acid or alkali actually neutralized. According to the usual procedure, this means a limit of a maximum of 2 or 3% of solids in the regenerant, but normally less, and corresponding large quantities of regenerant liquids.

On the other hand, my process employs the lowest possible volume of regenerants with the use of an economically small excess of chemicals, and the concentration of the regenerant solids is increased both relatively and absolutely.

In carrying out my process, the sufficient but minimum volume of the two exchanger beds is first determined for each particular case, depending upon the volume and the solid content of the waste liquid to be purified, thus avoiding any unnecessary excess of circulating liquids, especially those for rinsing purposes.

The absorption having been carried out according to either one of the above methods, one first regeneration cycle is performed respectively with an acid solution and an alkaline solution of low concentration having ionizations corresponding to around pH 0 for the acid and 10 to 12 for the alkali. Instead of being discarded, as is usual practice when mere purification of the liquid is intended, the outflowing regenerant solutions are now readjusted to their original pH values of 0 to 1.5 for the acid, of 10 to 12 for the alkali, by adding fresh acid and fresh alkali respectively. The reinforced regenerant solutions which now contain a certain amount of neutralized recovered salts plus free acids or alkali, are reused for a new regeneration cycle.

These operations are repeated as often as the increase in concentration of solids in the solution does not reach the desired limit. Thus, concentrations of up to 20% of solids can be obtained.

The actual regeneration operations may be carried out as follows:

The saturated ion exchanger is treated first with a portion of the said concentrated regenerant solution, so as to neutralize the free acids or alkalis of the regenerant, and the regenerant flows out highly concentrated and sufficiently neutral, as to permit recovery of the solids without undesirable excess of reactants.

In a following second flow the exchanger bed is treated with the cycling and continuously reinforced regenerant as above mentioned, and is thus freed substantially completely from the absorbed cations and anions.

Finally, in a third flow, the exchanger bed is rinsed with fresh water, the volume of which is equal to that of the concentrated outflowing regenerant of the first step. This rinse water, having eliminated most of the adherent regenerants, now serves for the preparation of new regenerant through the addition of equivalent acid or alkali. If desired, before reusing the regenerated exchanger bed for following absorption, it may still be rinsed with water to remove the last traces of regenerant. These final rinse waters can be discarded without causing more than negligible losses of recoverable materials.

Having transferred the electrolytes from the very weak waste solutions into a concentrated solution, the recovery of the same can now be carried out in a simple and economical manner depending upon the nature of these solids and the products desired. If the recovery of proteinaceous materials, together with vitamins and mineral salts is the desired aim, as in the case for instance, for use as cattle feed or human foodstuffs, the two regenerants obtained according to this invention are combined; the one regenerant being slightly acid and the other slightly alkaline. This combination results in mutual neutralization, and preferably so as to yield a solution with a pH of about 6 to 6.5, and with a total solid content of between 10 and 20%. Simple drying of this concentrated solution, either alone, or mixed with other suitable materials, yields the final feed or foodstuff. Obviously, low temperatures and high speeds must be employed when vitamins are present, in order that they may be preserved. This is especially true in the case of grain distillers' slop which has been previously treated to remove suspended solids, or waste liquids from the milk or meat industry.

Separate drying of the two regenerants, with or without preliminary neutralization, may be carried out, if the separated solids are to be used for distinct purposes.

In some cases, the recovery of only either the acid or the alkaline group of electrolytes may be desired, the other group being present either in too low a proportion or having a minor economic value. In such case, one of the two regenerants may be discarded, and the regeneration carried out only for the valuable group.

Furthermore, my invention permits the selective recovery of only a part of either group of the electrolytes. Since it has been demonstrated that the absorption is carried out in at least two steps, the composition of the regenerant outflowing after each of these steps is different, and the regenerant can be collected separately.

Another modification deals with the appropriate use of the regenerant chemicals in accordance with the products to be obtained. This is of importance, for instance, when the recovered solids are to be used as fertilizers. In the latter case, the use of the usual chemicals, especially sodium carbonate or sodium hydroxide, is too expensive or even undesirable, and ammonia solutions should be used as anion regenerants, the concentration of which can be increased step by step as set forth above. The important feature of this procedure is that the ammonia must be neutralized with some acid, usually with sulfuric acid, before its utilization as a fertilizing salt. This reaction is performed according to my invention through the neutralizing regeneration, and is economically valuable because of the nitrogen content of the resulting fertilizer.

In some instances it may be desirable to use, in whole or in part, phosphoric acid or acid phosphate for the cation regeneration and potassium compounds for the anion regeneration, in order to enrich eventually the resulting fertilizer in valuable materials. Examples of such are molasses slops which are very rich in potassium salts and contain fair amounts of phosphates and nitrogen compounds.

The liquids remaining after the above elimination and recovery of valuable products is now substantially free from mineral salts and from nitrogenous compounds, but may contain some non-electrolytes, for example, carbohydrates. The discarding of these liquids does not result in losses of valuable materials, but may, if desired, be thrown away into rivers without undesirable results, since putrefaction of the river waters will not occur and deoxidation will be reduced substantially.

However, if desired, these liquids may be evaporated in order to produce carbohydrate enriched solids, which may be used for various purposes.

Another modification in my invention for the total utilization of such waste liquids relates particularly to slops resulting from various fermentation processes of carbohydrates. Previous to fermentation, the carbohydrates of the various raw materials used must be converted into fermentable sugars. In the event that they are not present in such form prior to fermentation, such conversion may be carried out either by means of enzymes contained in malts or through the action of mineral salts. However, not all of the carbohydrates are converted by this treatment, especially when using malts of various origin under technical conditions. As a consequence, a part of the carbohydrates go through the fermentation process without yielding the desired end products.

It is a surprising discovery that fermentation liquids, after undergoing the above purification steps can be returned again to a new fermentation process with good results. In some cases, up to one half of the purified carbohydrates from the purified waste liquids yield corresponding quantities of desired product, for example, ethyl alcohol, when the fermentation mass is inoculated with small amounts of yeast. Without preliminary purification, some fermentation also occurs, but to a lower degree and infection occurs. These fermentable carbohydrates may be the result of hydrolysis occurring after the main fermentation process during cooking, distilling, etc., or they may have escaped in a major or minor degree the action of the fermenting enzymes.

Whatever may be the reason specific to the raw materials used and the process employed, I have found that the return of these purified waste liquids into the main process in substitution for the major portion of the fresh water used for washing the grains or the dilution of molasses, etc., is not only feasible but gives an increase in the total fermentation output without causing troubles.

Return or back slopping of fermented wort has been previously attempted in industrial processes, but heretofore nothing more than a relatively small portion could be refused without causing considerable trouble in the fermentation, and without giving any noticeable increase in the fermentation yield. According to my process, such return is perfectly satisfactory and has a double advantage:

(1) The entire elimination of any waste liquids and sometimes appreciable economy in fresh water supply.

(2) Improvement in the yield of fermented products through more complete utilization of the carbohydrates as well as the 100% utilization of the nitrogenous compounds and vitamins.

The following example illustrates a method of carrying out my invention for the production of ethyl alcohol from grains but it is to be understood that this example is by way of illustration and not of limitation.

A mixture of 90% wheat and 10% barley malt is mashed, fermented, the produced alcohol distilled off, and the so-called wet grains eliminated through screening according to normal practice. The resulting slop or thin stillage is now centrifuged preferably in two steps as shown in the accompanying flow sheet in order to eliminate the suspended proteinaceous materials. The liquid now remaining contains 2.9% solids, the composition of which was determined as being the following:

|  | Per cent |
| --- | --- |
| Proteinaceous compounds (Nx6.25) | 25 |
| Mineral salts | 32 |
| Nitrogen free extract (carbohydrates) | 40 |

This solution is flowed through two rows of 2 or 3 tanks each, filled to about one half of their volume with granulated synthetic phenol-formaldehyde resins acting as ion exchanger of the cation absorbing type ("C") on one hand, and with granulated synthetic amine-formaldehyde resins of the anion type ("A") on the other. The volume of the resins beds in each tank had been calculated exactly according to the volume and solid content. (1 volume of resin bed per 25 volumes of the liquid to be treated per operation). After the saturation of one resin bed of either type, the respective affluents and effluents are shifted so as to permit the saturated bed to be regenerated. For the regeneration of the "C" exchanger, a solution is used that contains initially 5% HCl, and for the "A" exchanger a solution with initially 1% $Na_2CO_3$ and 1% NaOH. These regenerant solutions are collected and reused after addition of fresh acid and hydroxide so as to maintain the pH of the acid at 0 up to 0.5, of the alkali at 11 to 12. Thus the solid content of these regenerants increases gradually to around 15%, and the regenerant is then used for a final operation in insufficient quantity for exhaustion of the exchanger bed, and is neutralized to a pH of around 3 on the acid side and about 8 on the alkaline. The exchanger bed may be exhausted by treatment with fresh regenerants. The two regenerants are then combined in a proportion to result into a final liquid of a pH value of around 6 and a solid content of about 15%. This concentrated solution is dried, for instance, upon a roller dryer or through spraying. The dried solids contain on a dry basis

|  | Per cent |
| --- | --- |
| Proteinaceous compounds (Nx6.25) | 29 |
| Potassium, calcium, magnesium-phosphates | 30 |
| Sodium chloride and various | 41 | and part of the soluble vitamins.

This product may be mixed with the previously recovered suspended proteins thus enriching the latter in nutritionally valuable mineral salts and vitamins, or may be used separately.

The continuously outflowing purified slop, on the other hand, has its solid content now reduced from 2.9% to 1.5%, of which between 16 and 20% are proteinaceous compounds, the remaining 80 to 84% are mineral- and nitrogen-free "extract" or mostly carbohydrates and carbohydrate compounds. It is reintroduced in the main process thus substituting part of the fresh water necessary for the grain mashing and fermentation-operations.

The accompanying flow sheet illustrates my invention, as an example for treating and reusing grain alcohol distillery stillage. In this flow sheet, C/1, C/2, C/3 and A/1, A/2, A/3 represent the respectively and alternatively used cation and anion exchanging apparatus.

The total volume of the purified slop represents on an average around 70% only of the corresponding total water volume as introduced for the grain mashing and during fermentation operations. The remaining 30% of water has been eliminated as moisture adherent on the wet grains and on the recovered suspended solids; in both cases the moisture content varies between 70 and 85%. This fact is important for the continuous reintroduction of the final liquid. Obviously, the solid content of the fermenting wort and of the stillage will increase as a sequel to that reintroduction; however, the solid-content of the adherent water of the outgoing solid products will raise by the same token. Thus, after a certain number of recycling operations, this increase of solids will diminish more and more and, finally, an equilibrium is obtained. The definite maximum content in solids of the final slop reaches around 3% from the initial 1.5%; the output in dried grains as well as in dried suspended proteins increases accordingly so as to yield between 10 and 15% more solid products than in usual operations with fresh water.

The fermentation process itself continues in a perfectly satisfactory way and yields between 2 and 4% more ethyl alcohol than without my reintroduction; this increase corresponds to one fourth and more of the reintroduced carbohydrates.

The above given figures refer to one specific example of operation. The relative economy of this recovering method becomes even more striking the more dilute are the liquids wasted up to now. The composition of the resulting products will vary according to the grain materials used, especially as to the content in nitrogenous materials and vitamins and to the relative proportions of the amino acids.

Quite different features regarding the composition of the waste liquids and of the products to be obtained result from fermentation of molasses either for the production of ethyl alcohol or other fermentation products or for the growing of yeast for instance. Here, the economic importance depends less upon the content of proteinaceous compounds than in the minerals, particularly in the relatively high amount of potassium salts. The method of proceeding again is exactly the same as described, but sulfuric acid is employed instead of hydrochloric, and ammonia solution is substituted for the above mentioned sodium carbonate and partly or totally the sodium hydroxide. The resulting products are, hence, mixtures of phosphates and sulfates of potassium, ammonium and other nitrogenous bases, representing valuable concentrated fertilizing products.

Furthermore, it has no bearing upon my method when ion exchangers other than the said types of resins are used, provided that their efficiency is assured.

I claim:

1. The method of utilizing proteinaceous waste liquids, comprising recovering the insoluble proteins and carbohydrates by mechanical separation, then subjecting the clarified liquids to ion exchange to eliminate anions and cations, regenerating the cation exchanger by passing thereover an aqueous acid solution of a pH-value around 0, readjusting the pH of the outflowing regenerant solution again to 0–1.5 by adding fresh quantities of acids, passing the latter solution over the cation exchanger, continuing reinforcement and recycling until the concentration in solids reaches 10 to 20% of the regenerant liquid, and recovering the solids from the concentrated solution.

2. The method of utilizing proteinaceous waste liquids, comprising recovering the insoluble proteins and carbohydrates by mechanical separation, then subjecting the clarified liquids to ion exchange to eliminate anions and cations, regenerating the anion exchanger by passing thereover an aqueous alkaline solution of a pH-value of around 10–12, readjusting the pH of the outflowing regenerant solution again to 10–12 by adding fresh quantities of alkali, passing the latter solution over the anion exchanger, continuing reinforcement and recycling until the concentration in solids reaches 10 to 20% of the regenerant liquid, and recovering the solids from the concentrated solution.

3. The method of utilizing proteinaceous waste liquids, comprising recovering the insoluble proteins and carbohydrates by mechanical separation, then subjecting the clarified liquids to ion exchange to eliminate anions and cations, regenerating the cation exchanger by passing thereover an aqueous acid solution of a pH-value around 0, readjusting the pH of the outflowing regenerant solution again to 0–1.5, repassing the latter solution over the cation exchanger, regenerating the anion-exchanger by passing thereover an aqueous alkaline solution of a pH around 10–12, readjusting the pH of the outflowing regenerant solution again to 10–12, repassing the latter solution over the anion exchanger, combining the outflowing cation and anion regenerant solutions in such a proportion as to obtain a neutralized liquid of a pH of 6–7 and recovering the solids from the latter solution.

4. The method of utilizing proteinaceous fermentation waste liquids, comprising screening and centrifuging the stillage to remove insoluble proteins and carbohydrates in form of a sludge, then subjecting the clarified liquids to ion exchange, returning the deionized effluent into the main process as a substitute for fresh water, regenerating the ion exchangers by cyclically passing thereover regenerant solutions, combining the recovered, concentrated and neutralized regenerant solutions with said protein sludge, and drying the mixture, thus providing a practically complete recovery of the soluble and insoluble proteins and vitamins as contained in the stillage, and eliminating any wastes resulting from the fermentation process.

5. The method of utilizing proteinaceous fermentation waste liquids, comprising screening and centrifuging the stillage, drying the thus separated protein products, subjecting the clarified liquids to ion exchange, returning the deionized effluent into the main process as a substitute for fresh water, regenerating the ion exchangers by cyclically passing thereover regenerant solutions, adjusting the latter solutions to a pH of 6 to 7, drying them, thus providing a practically complete recovery of the soluble and insoluble proteins and vitamins as contained in the stillage, and eliminating any wastes resulting from the fermentation process.

6. The method of utilizing proteinaceous waste liquids containing electrolytes, as described in claim 1, comprising carrying out the last cycle of regeneration with a regenerant solution already concentrated but no more readjusted in pH, completing the exhaustion of the exchanger with fresh regenerant solution, finally rinsing the exhausted exchanger bed with limited quantities of fresh water, and using such rinse water for the preparation of fresh regenerant solution.

7. The method of utilizing proteinaceous waste liquids containing electrolytes, as described in claim 2, comprising carrying out the last cycle of regeneration with a regenerant solution already concentrated but no more readjusted in pH, completing the exhaustion of the exchanger with fresh regenerant solution, finally rinsing the exhausted exchanger bed with limited quantities of fresh water, and using such rinse water for the preparation of fresh regenerant solution.

VICTOR L. ERLICH.

REFERENCES CITED

The following references are of record in the file of this patent:

UNITED STATES PATENTS

| Number | Name | Date |
| --- | --- | --- |
| 1,583,151 | Hind | May 4, 1926 |
| 2,049,524 | Stillwell | Aug. 4, 1936 |
| 2,082,711 | McHargue | June 1, 1937 |
| 2,263,608 | Brown | Nov. 25, 1941 |
| 2,341,381 | Jelley et al. | Feb. 8, 1944 |
| 2,354,172 | Myers | July 18, 1944 |
| 2,387,824 | Block | Oct. 30, 1945 |

OTHER REFERENCES

"Demineralizing Solutions," by Tigir et al., Feb. 1943, Pub. by Permutit Co., N. Y. C.

"Amberlite," Chem. Eng. News, Sept. 10, 1943.